United States Patent [19]

Barbee

[11] Patent Number: 4,591,001
[45] Date of Patent: May 27, 1986

[54] GARDEN TILLERS

[76] Inventor: Jesse J. Barbee, Rte. 1, Box 424, Phenix City, Ala. 36867

[21] Appl. No.: 663,598

[22] Filed: Dec. 21, 1984

[51] Int. Cl.⁴ .................. A01B 35/18; A01B 69/02; A01B 33/16
[52] U.S. Cl. ........................ 172/43; 172/71; 172/112; 172/126; 172/253
[58] Field of Search .......... 172/42, 43, 63, 71, 172/126, 130, 136, 256, 253, 341

[56] References Cited

U.S. PATENT DOCUMENTS

| | | | |
|---|---|---|---|
| 2,835,182 | 5/1958 | Smithburn | 172/43 |
| 4,144,945 | 3/1979 | Hamilton | 172/256 X |
| 4,189,008 | 2/1980 | Porter | 172/253 |

OTHER PUBLICATIONS

Ariens Company, *Ariens ® Mowers Tillers Tractors*, Sep. 1984, Brillion, WI 54110 (Ariens Form #GNY84US), p. 16.

*Primary Examiner*—Richard J. Johnson
*Assistant Examiner*—Terrence L. B. Brown

[57] ABSTRACT

A toolbar attachment assembly for a rear tine rotary tiller having a tine guard and forward wheels. The toolbar attachment assembly is secured to the tiller in place of the drag stake. A V-shaped brace allows for the assembly to be attached without removing either the tines or the tine guard. A toolbar secured to the V-shaped brace allows for the releasable attachment of an extension which supports tools such as plows outwardly of the toolbar for the laying off of rows and for throwing dirt to cover weeds in established rows of plants.

4 Claims, 10 Drawing Figures

GARDEN TILLERS

BACKGROUND OF THE INVENTION

1. Field of the Invention

This invention relates generally to a plow attachment for garden tillers. The attachment serves not only to lay off the rows, but it also throws soil to the plants for the purpose of killing weeds and grass that may be growing in the row.

2. Description of the Prior Art

A problem commonly encountered with gardening with a rotary tiller is the fact that it breaks up the soil only, then one has to pull a line to lay off rows by hand with a hoe to plant the seed or set out plants, or one uses a one wheel hand pushed garden plow.

The following Patents were found on record in the Patent Search: U.S. Pat. Nos. 1,661,122 3,502,152 1,909,307 3,504,748 1,525,262 3,807,506 2,485,057 4,434,856

SUMMARY OF THE INVENTION

It is the object of this invention to provide an improved means for both laying off rows while breaking up the soil and for throwing soil to established rows of plants in order to kill any weeds or grass that may be growing in the row of plants by covering up the weeds or grass with soil. This means is a toolbar attachment assembly attached to the rear of a tiller of the type having front support wheels, rear rotary tines, and a tine guard. The toolbar attachment assembly includes a support which is a V-shaped brace that extends rearwardly and upwardly from the tiller. The V-shaped brace has a forward connecting member adjustably attached to the tiller in place of the typical depth bar or drag stake. The V-shaped brace and connecting member are configured so that the toolbar attachment assembly may be attached to the tiller without removing either the tines or the tine guard.

DESCRIPTION OF THE PREFERRED EMBODIMENT

Figure 1:
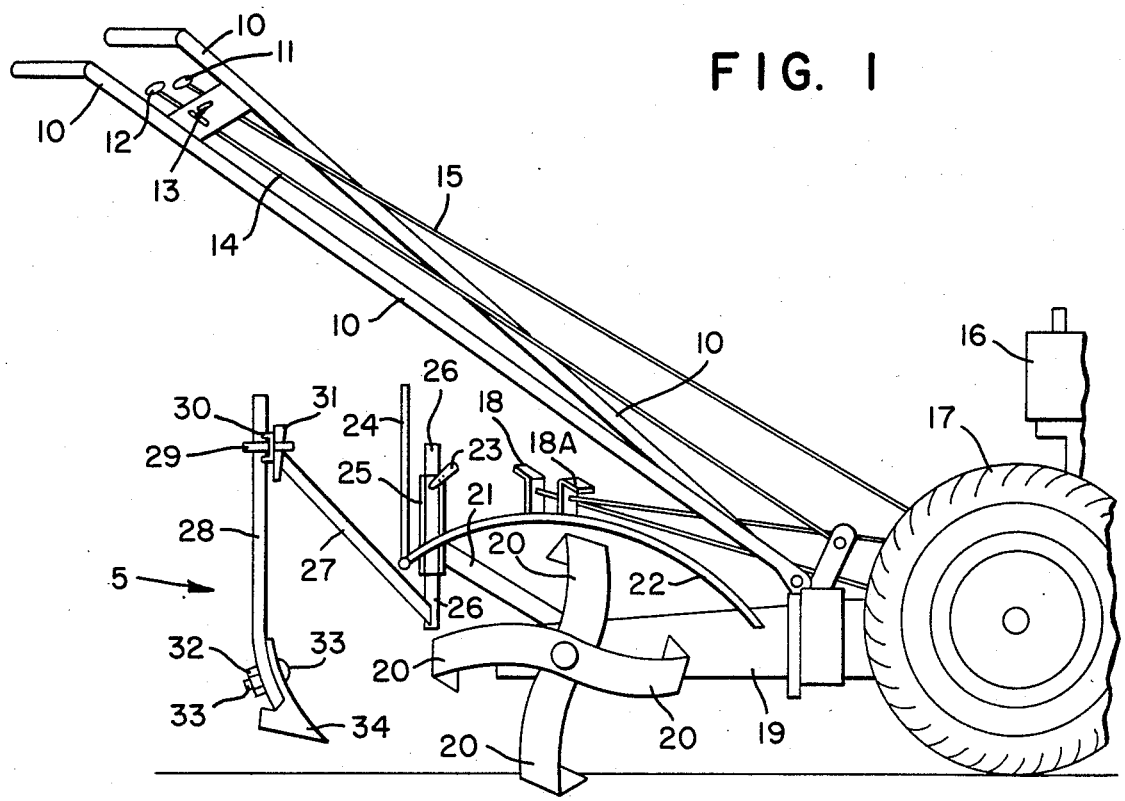
FIG. 1 shows a garden tiller of the type having a vertically disposed drag stake holder with the plow attachment or toolbar attachment assembly in place behind the tines.
Figure 2:
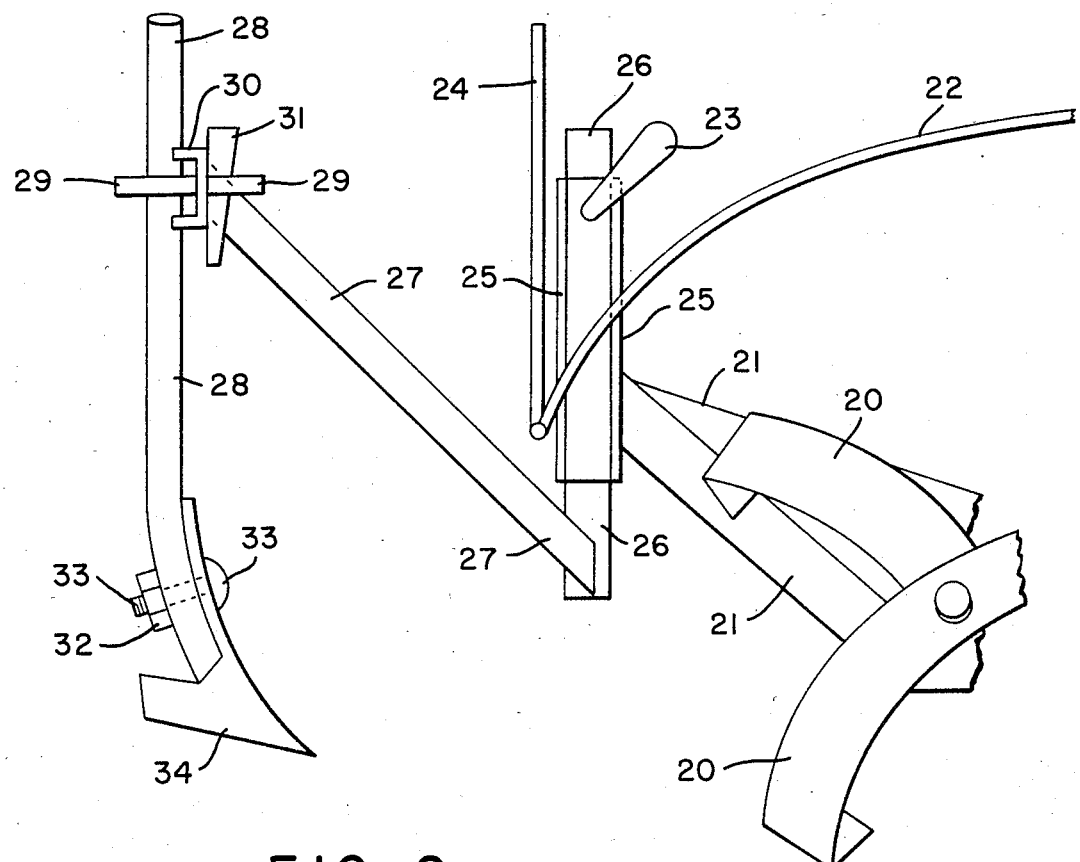
FIG. 2 shows the plow attachment of FIG. 1 on an enlarged scale.

The operator maneuvers the conventional tiller with handle bars 10 as seen in FIGS. 1 and 2 of the drawings. A knob 11 is attached to the top end of rod 15 for engaging the idler that tightens and loosens the belts for putting the tiller in forward or reverse. Pushing down knob 11 puts the tiller in forward and pulling up knob 11 puts the tiller in reverse. The battery 16 is used for the electric starter. The wheels and tires are generally indicated by 17.

Knob 12 on the end of rod 14 is used to unlock the handle bars 10 so that they will swing to the left or right so one does not have to walk behind the tiller in freshly tilled soil. Lever 18 serves to engage the tines. Lever 18A is connected to the transmission and shifts the tiller into low or high speed. The transmission case 19 houses the transmission.

The toolbar attachment assembly invention includes brace 21 welded to the drag bar holer 25, which is attached to transmission case 19. Arcuate guide shield 22 covers the upper portion of the tines 20. A spring loaded pin 23 holds connecting member 26 of the toolbar attachment assembly 5 in place within the drag stake or drag bar holder 25. Connecting member 26 is held in the drag stake holder 25 in the same manner as a conventional drag stake (not shown) is adjustably held.

Conventional flap 24 is attached by a hinge to shield 22 and is swung down to cover tines when the plow attachment 5 is not in place. As shown flap 24 is swung up when the plow attachment 5 is attached to the tiller. It is not necessary to remove tine guard 24 over tines 20 in order to adjustably secure the toolbar attachment assembly 5. The plow attachment 5 includes a connecting member 26 which is welded or similarly attached to the forward end of a V-shaped brace 27. Brace 27 is welded at its upward and rearward end to a toolbar 30.

A standard 28 is rigidly attached to a plow 34 by a plow nut 32 and bolt 33. Standard keeper 29 along with wedge 31 are conventional adjustable attachment means. Wedge 31 is driven down to lock standard keeper 29 in place. For example, the operating depth of plow 34 is set by placing standard 28 at the desired height surrounded by standard keeper 29 which passes through an opening 40 in toolbar 30. Wedge 31 is then placed between toolbar 30 and the end of standard keeper 29 opposite standard 28. The operator then drives wedge 31 further down with a hammer or the like to ensure a secure attachment. For removal or readjustment of the plow and standard the operator knocks out wedge 31 by striking it from below.

Figure 4:
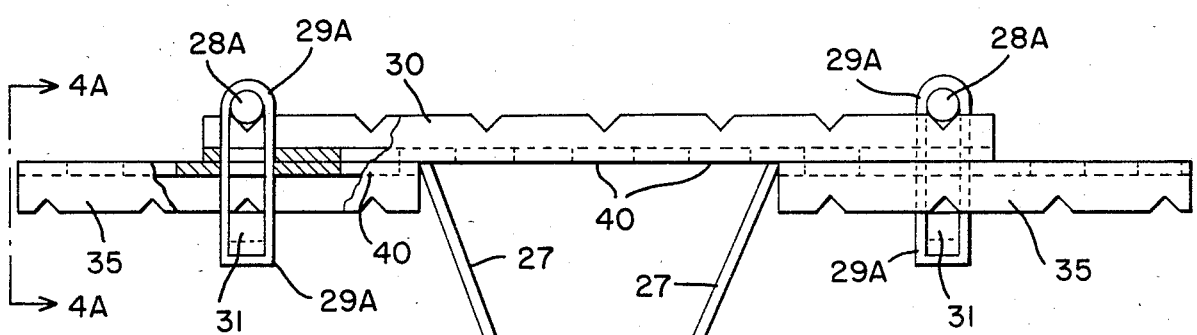
FIG. 4 is a plan view of the tiller of FIG. 3 with parts broken away for clarity showing the detachable extensions connected to each side of the toolbar attachment assembly with a small plow on respective outer ends of the extensions. The extensions are for laying off the rows as the soil is tilled.
Figure 4A:
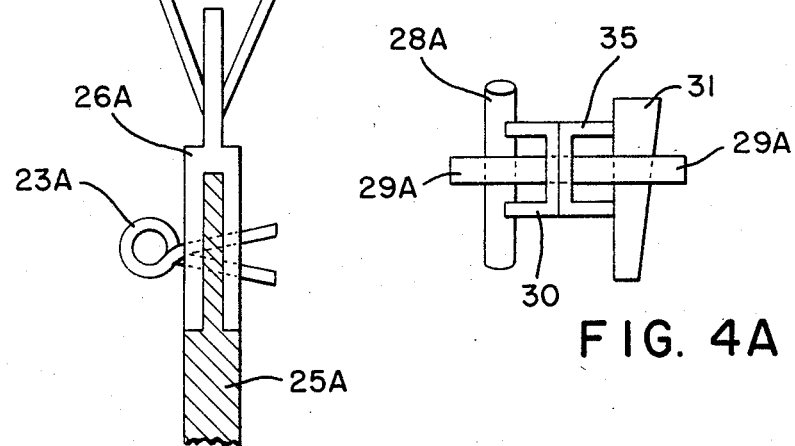
FIG. 4A is a section taken along the lines 4A—4A of FIG. 4 showing the extension connected to the toolbar.
Figure 5:
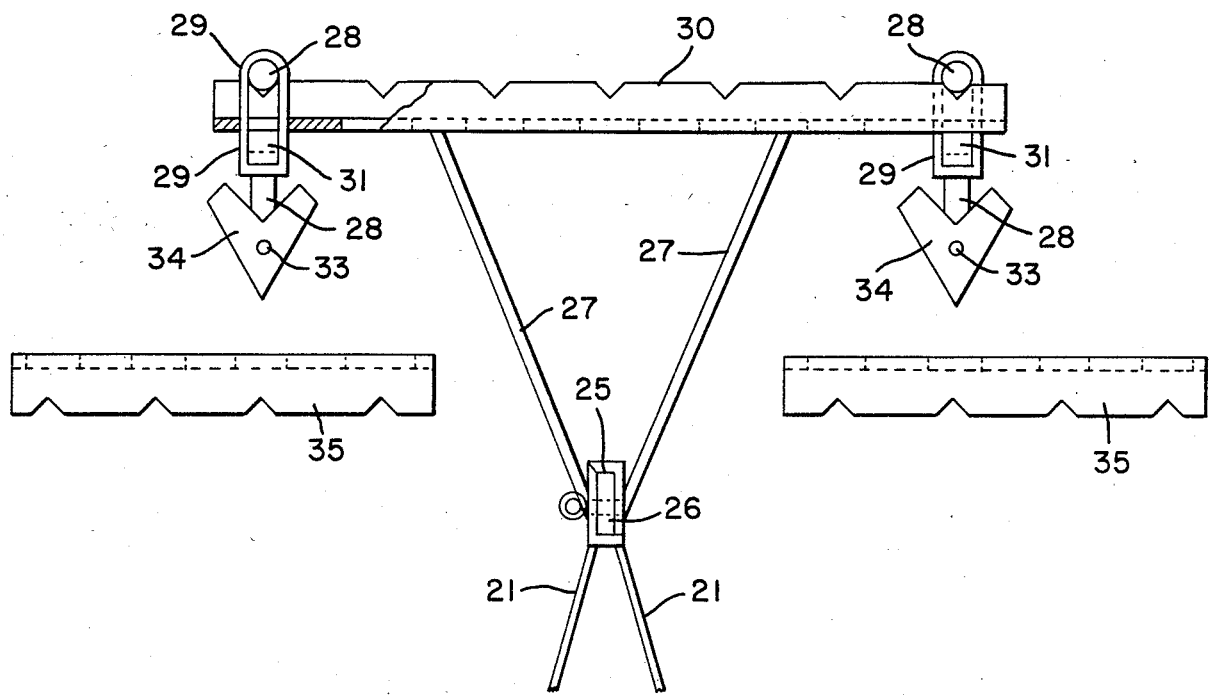
FIG. 5 shows a plan view of the tiller of FIG. 1 having a plow on each end of the toolbar as used to throw soil to rows of plants.
Figure 6:
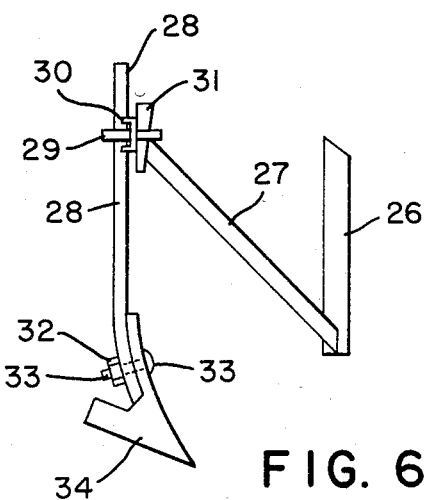
FIG. 6 shows the plow attachment embodiment of the tiller of FIG. 1.

In order to use extension 35 as shown in FIG. 4 with plows 34 in place outwardly of toolbar 30, a short rod 28A of the same diameter as standard 28 and without an attached plow is used. See FIG. 4A. A modified standard keeper 29A, an elongated version of standard keeper 29, can pass through the respective aligned holes 40 of extension 35 and toolbar 30 attached back to back as shown in FIGS. 4 and 4A.

Figure 3:
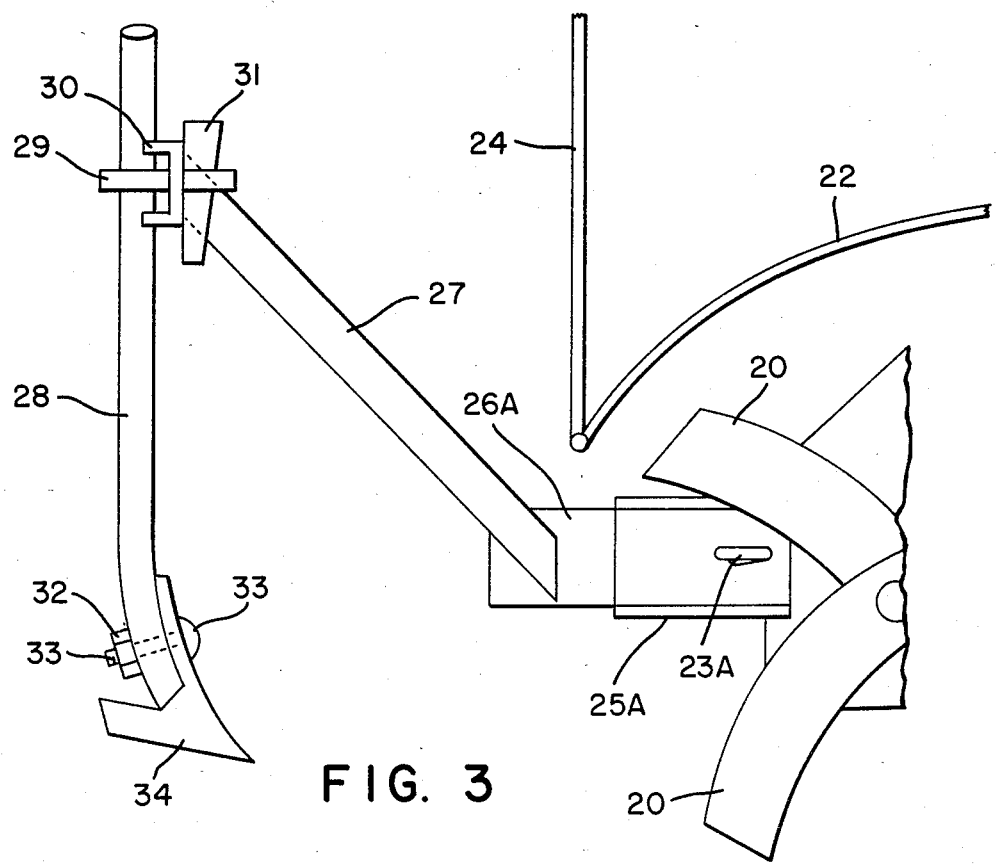
FIG. 3 shows an alternative embodiment of the plow attachment that fits tillers of the type having a horizontally disposed drag stake holder.
Figure 7:
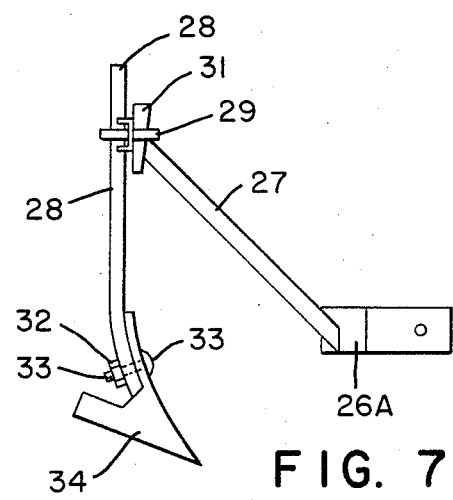
FIG. 7 shows the alternative plow attachment embodiment of the tiller of FIG. 3.
Figure 8:
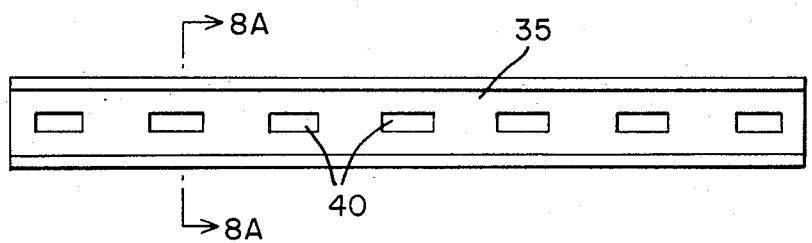
FIG. 8 is an elevation of extension 35.
Figure 8A:
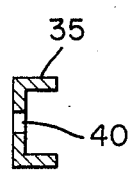
FIG. 8A is a section taken along the line of 8A—8A of FIG. 8.

Referring now to FIGS. 3, 4, and 7, an alternative embodiment of the connecting member for the toolbar attachment assembly is designated as 26A. Connecting member 26A is horizontally disposed in use and is for tillers of the type having rearwardly extending horizontal drag stake holders 25A. The connecting member 26A is releasably secured to drag stake holder 25A by conventional pin 23A.

Conventional parts of the toolbar attachment assembly include standard 28, standard keeper 28, toolbar 30, wedge 31, nut 32, and bolt 33. Improved modified parts are rod 28A and standard keeper 29A. New parts include V-shaped brace 27, and connecting members 26 and 26A.

I claim:

1. A garden tiller comprising forwardly disposed powered wheels and rearwardly disposed rotary cultivating tines, an arcuate shield covering the upper portion of said tines, and a drag stake mount for receiving a drag stake located rearwardly of said rotary tines, said drag stake mount comprising a drag stake holder adapted to support and removably secure an attaching portion of a drag stake, a toolbar attachment assembly adapted to be removably supported by said drag stake mount, said toolbar attachment assembly comprising a connecting member correspondingly configured to said drag stake attaching portion for removable attachment with said drag stake holder, said toolbar attachment assembly further comprising upwardly and rearwardly diverging arms forming a generally V-shaped rear support bracket, said arms being connected at their forward ends to said connecting member and at their rear ends to a substantially horizontal, laterally disposed toolbar adapted to removably secure tools along its length, said rear support bracket with said toolbar attached thereto being adapted to be secured to said holder so as to extend upwardly and rearwardly from beneath said shield without said shield being removed.

2. The garden tiller of claim 1 wherein said toolbar further comprises detachably secured extensions, whereby said toolbar may be laterally extended to receive plows to make rows.

3. The garden tiller of claim 1 wherein said connecting member of said toolbar attachment assembly is substantially horizontally and longitudinally disposed.

4. The garden tiller of claim 1 wherein said connecting member is substantially vertically disposed.

* * * * *